United States Patent
Richards

(10) Patent No.: US 10,974,731 B2
(45) Date of Patent: Apr. 13, 2021

(54) VEHICLE FAULT DETECTION SYSTEM

(71) Applicant: Ford Global Technologies, LLC, Dearborn, MI (US)

(72) Inventor: Adam J. Richards, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 178 days.

(21) Appl. No.: 16/364,990

(22) Filed: Mar. 26, 2019

(65) Prior Publication Data

US 2020/0307613 A1  Oct. 1, 2020

(51) Int. Cl.
*B60W 50/02*  (2012.01)

(52) U.S. Cl.
CPC ... *B60W 50/0205* (2013.01); *B60W 2510/104* (2013.01); *B60W 2510/182* (2013.01); *B60W 2520/125* (2013.01); *B60W 2520/28* (2013.01); *B60W 2540/18* (2013.01)

(58) Field of Classification Search
CPC ....... B60W 50/0205; B60W 2510/104; B60W 2510/182; B60W 2520/125; B60W 2520/28; B60W 2540/18
See application file for complete search history.

(56) References Cited

U.S. PATENT DOCUMENTS

| | | |
|---|---|---|
| 6,784,793 B2 | 8/2004 | Gagnon |
| 7,032,436 B2 | 4/2006 | Yokota et al. |
| 7,444,223 B2 | 10/2008 | Thumrugoti |
| 8,380,418 B2 | 2/2013 | Bae et al. |
| 8,961,364 B2 * | 2/2015 | Nefcy ............. F16D 48/02 477/5 |
| 10,119,985 B2 | 11/2018 | Zwegers |
| 2002/0036567 A1 * | 3/2002 | Larson ............. B60C 23/061 340/442 |
| 2003/0076234 A1 * | 4/2003 | Bergerhoff ......... B60C 23/0416 340/686.1 |

(Continued)

FOREIGN PATENT DOCUMENTS

| | | |
|---|---|---|
| GB | 2522728 A | 5/2015 |
| WO | 2008062257 A2 | 5/2008 |
| WO | 2017142536 A1 | 8/2017 |

OTHER PUBLICATIONS

Johnny Nocera, "Dr. Johnny's Car Clinic: What to do when your brakes pulse", Naples Daily News, published Jun. 16, 2011 (Year: 2011).*

*Primary Examiner* — Jeff A Burke
*Assistant Examiner* — Jamal A Shah
(74) *Attorney, Agent, or Firm* — Ray Coppiellie; Bejin Bieneman PLC

(57) ABSTRACT

A system includes a first sensor configured to detect a rotational position of a first wheel. The system includes a second sensor configured to detect a rotational position of a second wheel. The system includes a third sensor configured to detect a rotational speed of a driveline operatively coupled to the first wheel and the second wheel. The system includes a computer in communication with the first sensor, the second sensor, and the third sensor. The computer is programmed to detect a fault associated with the first wheel or the second wheel based on a correlation between an oscillation in the rotational speeds of the driveline and the rotational positions of the first wheel or the rotational positions of the second wheel.

20 Claims, 4 Drawing Sheets

(56) References Cited

U.S. PATENT DOCUMENTS

| | | | |
|---|---|---|---|
| 2003/0093197 A1* | 5/2003 | Bergerhoff | B60C 23/0416 |
| | | | 701/33.9 |
| 2003/0093198 A1* | 5/2003 | Bergerhoff | B60C 23/0416 |
| | | | 701/30.6 |
| 2003/0144801 A1* | 7/2003 | Braeuchle | B60Q 1/0076 |
| | | | 702/56 |
| 2009/0164060 A1 | 6/2009 | Fortson et al. | |
| 2010/0256874 A1* | 10/2010 | Carresjo | G01M 17/013 |
| | | | 701/48 |
| 2010/0274441 A1* | 10/2010 | Carresjo | B60C 23/0479 |
| | | | 701/31.4 |
| 2010/0308987 A1* | 12/2010 | Haas | B60C 23/041 |
| | | | 340/447 |
| 2013/0278771 A1 | 10/2013 | Magoun et al. | |
| 2015/0100505 A1 | 4/2015 | Binion et al. | |
| 2019/0389446 A1* | 12/2019 | Du | B60T 17/221 |

* cited by examiner

VEHICLE FAULT DETECTION SYSTEM

BACKGROUND

A vehicle may include one or more systems for monitoring components, assemblies, etc., of the vehicle. The systems may be designed to detect faults in operation of the components, assemblies, etc., of the vehicle. Detected faults my be provided to a vehicle onboard diagnostics connector (OBD-II).

DETAILED DESCRIPTION

Figure 1:
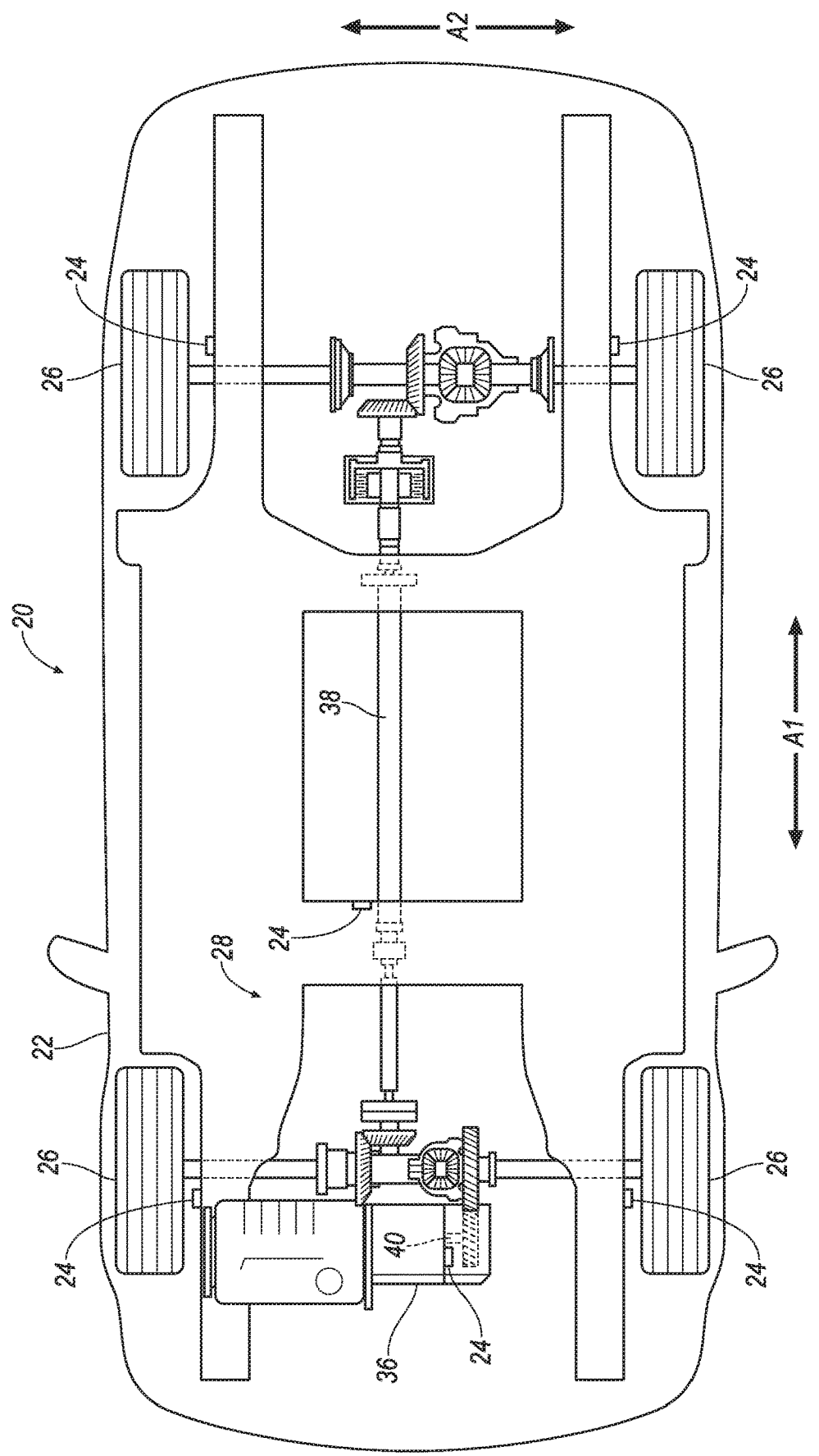
FIG. 1 is a bottom view of an example vehicle having a system for fault detection.

A system includes a first sensor configured to detect a rotational position of a first wheel. The system includes a second sensor configured to detect a rotational position of a second wheel. The system includes a third sensor configured to detect a rotational speed of a driveline operatively coupled to the first wheel and the second wheel. The system includes a computer in communication with the first sensor, the second sensor, and the third sensor. The computer is programmed to detect a fault associated with the first wheel or the second wheel based on a correlation between an oscillation in the rotational speeds of the driveline and the rotational positions of the first wheel or the rotational positions of the second wheel.

The first wheel may be spaced from the second wheel relative to a vehicle-longitudinal axis.

The first wheel may be spaced from the second wheel relative to a vehicle-lateral axis.

The third sensor may be configured to detect a rotational speed of a transmission output shaft.

The third sensor may be configured to detect a rotational speed of an axle.

The system may include a braking system, and the computer may be programmed to detect the oscillation while the braking system is actuated.

The system may include a steering system, and the computer may be programmed to detect the oscillation and the rotational positions of the first wheel and the second wheel before and after actuating the steering system.

The computer may be programmed to detect the oscillation and the rotational positions of the first wheel and the second wheel before and after a vehicle turn is executed.

The computer may be programmed to at least one of store data specifying the fault or transmit data specifying the fault in response to detecting the fault.

The computer may be programmed to correlate the oscillation with the rotational positions of the first wheel or the rotational positions of the second wheel by identifying a plurality of local minimum or maximum values in the rotational speeds of the driveline and identifying the first wheel or the second wheel as having rotational positions that consistently align with the local minimum or maximum values.

A system includes a processor and a memory storing instructions executable by the processor to detect positions of a first wheel of a vehicle and a second wheel of the vehicle based on data from a first sensor and a second sensor. The instructions include instructions to detect an oscillation in rotational speeds of a driveline operatively coupled to the first wheel and the second wheel based on data from a third sensor. The instructions include instructions to detect a fault associated with the first wheel or the second wheel based on a correlation between the oscillation in the rotational speeds of the driveline and the rotational positions of the first wheel or the rotational positions of the second wheel. The instructions include instructions to actuate a vehicle component in response to detecting the fault.

The instructions may include instructions to at least one of store or transmit data specifying the fault.

The instructions may include instructions to reduce an amount of hydraulic brake pressure provided by a braking system in response to detecting the fault.

The instructions may include instructions to correlate the oscillation with the rotational positions of the first wheel or the rotational positions of the second wheel by identifying a plurality of local minimum or maximum values in the rotational speeds of the driveline and identifying the first wheel or the second wheel as having rotational positions that consistently align with the local minimum or maximum values.

The instructions may include instructions to collect data specifying the detected positions of the first wheel and the second wheel before and after executing a vehicle turn, and detect the fault associated with the first wheel or the second wheel with the data collected before and after executing the vehicle turn.

The instructions may include instructions to collect first data specifying the detected positions of the first wheel and the second wheel, wait a specified amount of time, then collect second data specifying the detected positions of the first wheel and the second wheel, and detect the fault associated with the first wheel or the second wheel with the first data and the second data.

The instructions may include instructions to collect data specifying the detected positions of the first wheel and the second wheel while actuating a brake system of the vehicle, and detect the fault associated with the first wheel or the second wheel with the data collected while actuating the brake system.

The instructions may include instructions to collect data specifying the detected positions of the first wheel and the second wheel while a turn of the vehicle is executed, and detect the fault associated with the first wheel or the second wheel with the data collected while executing the turn.

The instructions may include instructions to collect data specifying the detected positions of the first wheel and the second wheel while the vehicle is subject to lateral acceleration above a determined threshold, and detect the fault associated with the first wheel or the second wheel with the data collected while the vehicle was subject to the lateral acceleration above the determined threshold.

The system may include the vehicle supporting the processor and the memory.

With reference to the Figures, wherein like numerals indicate like parts throughout the several views, a system 20 for fault detection in a vehicle 22 includes a first sensor 24 configured to detect a rotational position of a first wheel 26. The system 20 includes a second sensor 24 configured to detect a rotational position of a second wheel 26. The system 20 includes a third sensor 24 configured to detect a rotational speed of a driveline 28 operatively coupled to the first wheel 26 and the second wheel 26. The system 20 includes a computer 30 in communication with the first sensor 24, the second sensor 24, and the third sensor 24. The computer 30 is programmed to detect a fault associated with the first wheel 26 or the second wheel 26 based on a correlation between an oscillation in the rotational speeds of the driveline 28 and the rotational positions of the first wheel 26 or the rotational positions of the second wheel 26. The adjectives "first," "second," "third," etc., are used throughout this document as identifiers and are not intended to signify importance or order.

The system 20 enables identification of a location on the vehicle 22 (e.g., at a front right wheel 26, a rear left wheel 26, etc.) of a faulted component (e.g., a warped brake rotor) without requiring physical inspection at multiple locations (e.g., inspection of a brake rotor of each wheel 26).

The vehicle 22 may be any type of passenger or commercial automobile such as a car, a truck, a sport utility vehicle, a crossover vehicle, a van, a minivan, a taxi, a bus, etc. The vehicle 22 defines a vehicle-longitudinal axis A1, i.e., extending between a front and a rear of the vehicle 22. The vehicle 22 defines a vehicle-lateral axis A2, i.e., extending between a left side and a right side of the vehicle 22. The vehicle-longitudinal axis A1 and the vehicle-lateral axis A2 are perpendicular to each other. The front, rear, left and right sides, and relative directions used herein (such forward, rearward, upward, downward, lateral, etc.) may be relative to an orientation of an occupant of the vehicle 22. The front, rear, left and right sides, and relative directions used herein may be relative to an orientation of controls for operating the vehicle 22, e.g., a steering wheel, etc. The front, rear, left and right sides, and relative directions used herein may be relative to a driving direction of the vehicle 22 when wheels 26 of the vehicle 22 are all parallel with each other.

The wheels 26 of the vehicle 22 enable acceleration and deceleration of the vehicle 22. For example, one or more wheels 26 may be operatively coupled to a powertrain of the vehicle 22 such that power from the powertrain is provided to the wheels 26 as torque to accelerate or maintain speed of the vehicle 22. As another example, the wheels 26 may be operatively coupled to a braking system 32 of the vehicle 22 such that the braking system 32 resists rotation of the wheels 26 and reduces a speed of the vehicle 22. The wheel 26 enables a change in direction of the vehicle 22. For example, wheels 26 (such as those at the front of the vehicle 22) may be operatively coupled to a steering system 34 of the vehicle 22 such that the steering system 34 can change a steering angle of the wheels 26. The wheels 26 may support tires that contact a road or other driving surface.

The wheels 26 may be spaced from each other relative to the vehicle-longitudinal axis A1. For example, wheels 26 may be at the front of the vehicle 22, and other wheels 26 may be at the rear of the vehicle 22. The wheels 26 may be spaced from the each other relative to the vehicle-lateral axis A2. For example, wheels 26 may be at the right side of the vehicle 22, and other wheels 26 may be at the left side of the vehicle 22.

The powertrain of the vehicle 22 may include an internal-combustion engine and/or an electric motor. The powertrain may include the driveline 28. The driveline 28 transfers rotational speed and torque from the engine and/or motor to the wheels 26. The driveline 28 may include a transmission 36, an axle 38, a differential, etc. The transmission 36 transmits the kinetic energy from the engine to the axle 38 and ultimately to wheels 26 of the vehicle 22, while applying a gear ratio allowing different tradeoffs between torque and rotational speed. The transmission 36 may include an output shaft 40 operatively coupled to the axle 38 to transmit rotational speed and torque from the output shaft 40 to the axle 38. The powertrain is in communication with and receives input from the computer 30 and a human driver. The human driver may control the powertrain via, e.g., an accelerator pedal.

The braking system 32 resists the motion of the vehicle 22 to thereby slow and/or stop the vehicle 22. The braking system 32 may be friction brakes such as disc brakes, drum brakes, band brakes, and so on; regenerative brakes; any other suitable type of brakes; or a combination. The braking system 32 is in communication with and receives input from the computer 30 and a human driver. The human driver may control the braking via, e.g., a brake pedal. The brake system 20 may include rotors at each wheel 26. The braking system 32 may include hydraulically actuated calipers engageable with each of the rotors, e.g., with a brake pad. The brake system 20 may selectively control hydraulic pressure provided to each of the calipers, e.g., in response to a command from the computer 30.

The steering system 34 of the vehicle 22 controls a steering angle of the wheels 26 of the vehicle 22, e.g., in response to a command from the computer 30 and/or in response to an operator input, such as to the steering wheel. The steering system 34 may be a rack-and-pinion system with electric power-assisted steering, a steer-by-wire system, or any other suitable system for controlling the steering angle of the wheels 26. The steering system 34 may be in communication with the computer 30.

The vehicle 22 includes sensors 24. The sensors 24 may detect internal states of the vehicle 22, for example, wheel speed, wheel orientation (i.e., rotational position), steering angle, depression amount of accelerator and brake pedals, orientation of the steering wheel, and engine and transmission variables. The sensors 24 may detect the position or orientation of the vehicle 22, for example, global positioning system (GPS) sensors; accelerometers such as piezo-electric or microelectromechanical system (MEMS) sensors; gyroscopes such as rate, ring laser, or fiber-optic gyroscopes; inertial measurements units (IMU); and magnetometers. The sensors 24 may detect the external world, for example, radar sensors, scanning laser range finders, light detection and ranging (LIDAR) devices, and image processing sensors such as cameras. The sensors 24 may include communications devices, for example, vehicle-to-infrastructure (V2I) or vehicle-to-vehicle (V2V) devices.

The sensors 24 are configured to detect rotational positions of the wheels 26. For example, one sensor 24 may be supported at each wheel 26 and configured to detect the rotational position of the respective wheel 26. In other words, one sensor 24 may be configured to detect the rotational position of the right front wheel 26, another sensor 24 may be configured to detect the rotational position of the left front wheel 26, another sensor 24 may be configured to detect the rotational position of the right rear wheel 26, and another sensor 24 may be configured to detect the rotational position of the left rear wheel 26. The sensors 24 may be hall effect sensors configured to detect structure of the wheel 26 or structure operatively coupled to rotate with the wheel 26, e.g., teeth of a cog, or any other type of sensor 24 capable of detecting the rotational positions of the wheels 26.

The sensors 24 are configured to detect the rotational speed of the driveline 28 operatively coupled to the wheels 26. For example, one of the sensors 24 may be configured to detect a rotational speed of the output shaft 40 of the transmission 36. As another example, one of the sensors 24 may be configured to detect a rotational speed of the axle 38. Such sensors 24 may be hall effect sensors supported at the output shaft 40, e.g., fixed to a case of the transmission 36, hall effect sensors supported at the axle 38, e.g., fixed to a frame or body of the vehicle 22, or any other type of sensor 24 capable of detecting the rotational speed of the driveline 28.

The vehicle 22 may include a user interface 42 that presents information to and receives information from an occupant of the vehicle 22. The user interface 42 may be located, e.g., on an instrument panel in a passenger cabin of the vehicle 22, or wherever may be readily seen by the occupant. The user interface 42 may include dials, digital readouts, screens such as a touch-sensitive display screen, speakers, and so on for providing information to the occupant, e.g., human-machine interface (HMI) elements. The user interface 42 may include buttons, knobs, keypads, microphone, and so on for receiving information from the occupant.

Figure 2:
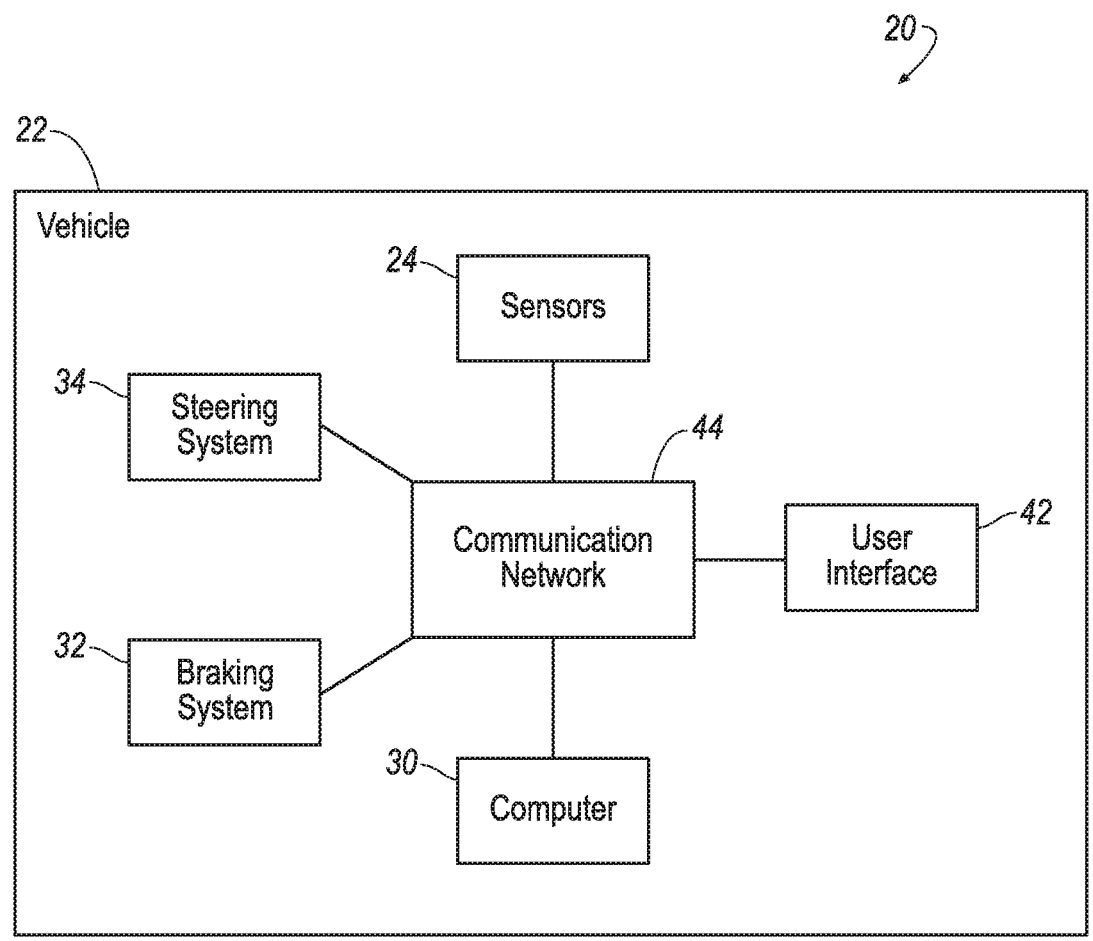
FIG. 2 is a block diagram of components of the vehicle.

The vehicle 22 includes a communication network 44. The communication network 44 includes hardware, such as a communication bus, for facilitating communication among vehicle components, e.g., the sensors 24, the computer 30, the braking system 32, the steering system 34, the user interface 42, etc. The communication network 44 may facilitate wired or wireless communication among the vehicle components in accordance with a number of communication protocols such as computer area network (CAN), Ethernet, WiFi, Local Interconnect Network (LIN), and/or other wired or wireless mechanisms The computer 30, implemented via circuits, chips, or other electronic components, is included in the vehicle 22 for carrying out various operations, including as described herein. The computer 30 is a computing device that generally includes a processor and a memory, the memory including one or more forms of computer-readable media, and storing instructions executable by the processor for performing various operations, including as disclosed herein. The memory of the computer 30 further generally stores data received via various communications mechanisms; e.g., the computer 30 is generally configured for communications on a controller area network (CAN) bus or the like, and/or for using other wired or wireless protocols, e.g., Bluetooth, etc. The computer 30 may also have a connection to an onboard diagnostics connector (OBD-II). Via the communication network 44, using Ethernet, WiFi, the CAN bus, Local Interconnect Network (LIN), and/or other wired or wireless mechanisms, the computer 30 may transmit messages to various devices in the vehicle 22 and/or receive messages from the various devices, e.g., the sensors 24, the computer 30, the braking system 32, the steering system 34, the user interface 42, etc., as discussed herein. Although one computer 30 is shown in FIG. 2 for ease of illustration, it is to be understood that the computer 30 could include, and various operations described herein could be carried out by, one or more computing devices The computer 30 is programmed to, i.e., the memory of the computer 30 stores instructions executable by the processor of the computer 30 to, actuate the brake system 20. For example, the computer 30 may transmit a command to the braking system 32 via the communication network 44 including data specifying an amount of hydraulic pressure to provide to brake calipers at each of the wheels 26. The data may specify different amounts of hydraulic pressure to provide at each wheel 26, e.g., higher pressure at one of the wheels 26 than at another of the wheels 26.

The computer 30 may determine that the brake system 20 has been actuated. For example, the computer 30 may store data in the memory specifying times at which the brake actuating was previously actuated, e.g., times at which the computer 30 commanded actuation of the braking system 32, times at which data from the sensors 24 specified that the brake pedal was depressed, etc.

The computer 30 may determine that the braking system 32 is presently being actuated. For example, data from the sensors 24 may specify depression of the brake pedal. As another example, the computer 30 may determine that the brake system 20 is being actuated when the computer 30 transmits a command the to brake system 20 specifying actuation.

The computer 30 may determine that a vehicle turn is being or was executed based on data from the sensors 24. For example, data from a GPS sensor may specify a position of the vehicle 22, e.g., relative to GPS coordinates. The computer 30 may associate and store times at which the vehicle 22 was at certain positions. A change in the position of the vehicle 22 over time may specify the heading direction of the vehicle 22. The computer 30 may determine that the turn of the vehicle 22 is executed by analyzing the positions of the vehicle 22 and respective times to identify when the heading direction if the vehicle 22 changes. As another example, data from the sensors 24 may specify a speed of the vehicle 22 and the steering angle of the wheels 26. The computer 30 may determine that the turn of the vehicle 22 is executed when the steering angle is above a threshold and the vehicle 22 has traveled at a certain speed for a threshold amount of time. The threshold amount of time may depend on the speed, e.g., a lower threshold for faster speeds and a higher threshold for lower speeds. In other words, the computer 30 may determine that the turn of the vehicle 22 is executed when the steering angle is above a threshold and the vehicle 22 has traveled at least a threshold distance. As another example, the computer 30 may determine that the turn of the vehicle 22 is executed when the vehicle 22 is subject to lateral acceleration above a determined threshold. The threshold may be determined based on empirical testing measuring various magnitudes of lateral accelerations of the vehicle 22 during execution of a turn.

Figure 3:
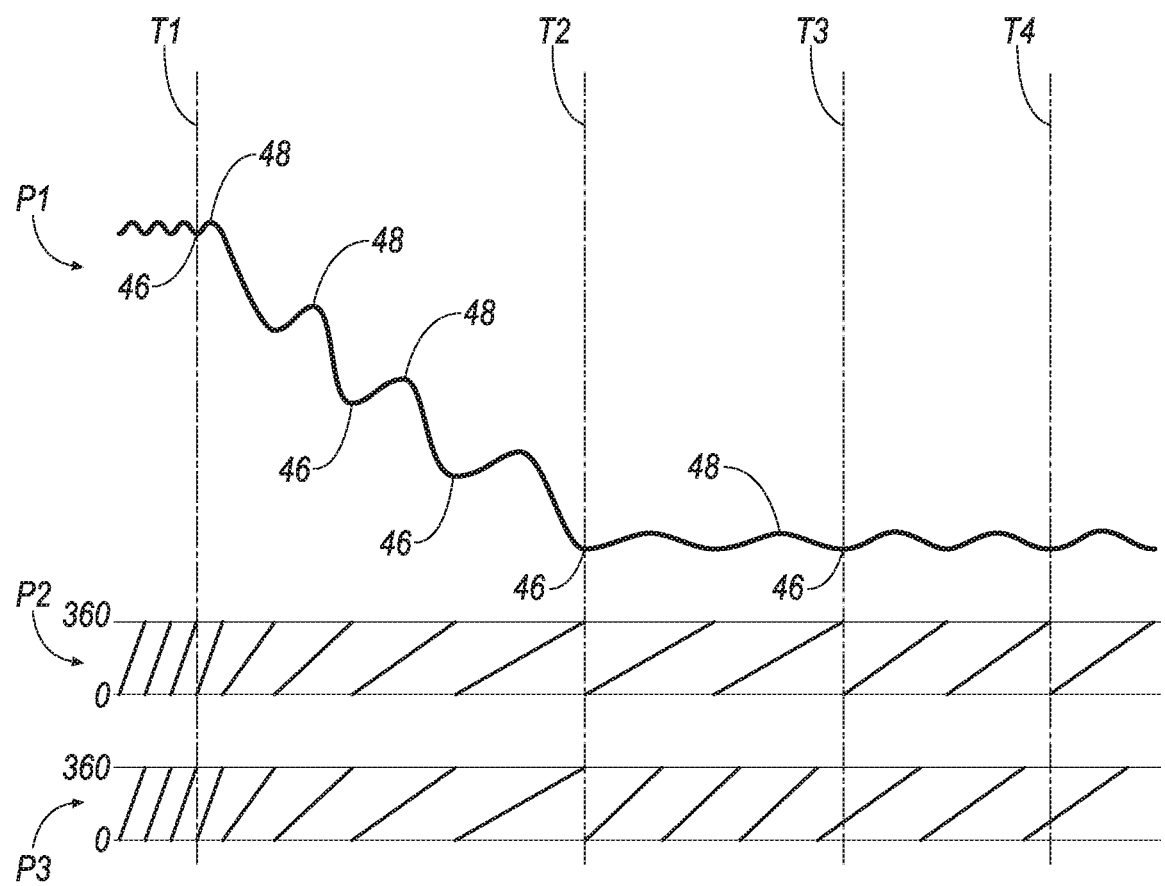
FIG. 3 is a plot of wheel positions and driveline speeds of the vehicle over time.

The computer 30 is programmed to detect an oscillation in the rotational speeds of the driveline 28 based on data from the sensors 24. For example, the computer 30 may detect an oscillation in rotational speeds of the output shaft 40 or the axle 38 based on data from the sensors 24. The computer 30 may detect the oscillation by collecting, i.e., receiving and storing, data from the sensors 24 specifying the rotational speeds, e.g., of the output shaft 40 and/or the axle 38, along with respective times of detection of the rotational speeds. An example plot P1 of the rotational speeds of the driveline 28 over time as specified by the stored data is shown in FIG. 3. The computer 30 may analyze the stored data specifying the rotational speeds and respective times to identify an oscillation, i.e., a repeating increase and decease in rotational speed. For example, the computer 30 may analyze the stored data specifying the rotational speeds and respective times to identify local minimum values 46 and/or local maximum values 48 of the rotational speeds with respect to time.

The computer 30 may be programmed to detect the oscillation while the braking system 32 is actuated. In other words, the computer 30 may detect the oscillation while the braking system 32 reduces speed of the vehicle 22. The computer 30 may determine that the braking system 32 is actuated based on data from the sensors 24, e.g., specifying that the brake pedal of the vehicle 22 is being depressed, that the speed of the vehicle 22 is decreasing by a threshold amount, etc. The computer 30 may determine that braking system 32 is actuated based on commands provided to the braking system 32 from the computer 30, e.g., the computer 30 may determine the braking system 32 is actuated when the computer 30 transmits a command via the communication network 44 to the braking system 32 specifying actuation of the braking system 32. The computer 30 may detect the oscillation based on data collected while the braking system 32 is being actuated.

Actuation of the braking system 32 may increase a magnitude of the oscillation, i.e., an amount of variation between the maximum values 48 and the minimum values 46 of the rotational speeds with respect to time. For example, in the plot P1 shown in FIG. 3 the rotational speeds are generally decreasing between T1 and T2 indicating that the braking system 32 is being actuated. The magnitude of the oscillation is greater between T1 and T2 than before T1 and after T2 where the rotational speeds are not generally decreasing and the brake system 20 is not being actuated.

The computer 30 may be programmed to detect the oscillation before and after actuating the steering system 34. For example, the computer 30 may analyze stored data specifying rotational speeds and respective times to identify oscillation of the rotational speeds that occurred before, and oscillation of the rotational speeds that occurred after, the computer 30 actuates the steering system 34. The computer 30 may actuate the steering system 34 by transmitting a command to the steering system 34 via the communication network 44, the command specifying actuation of the steering system 34 to move the wheels 26 to a certain steering angle.

The computer 30 may be programmed to detect the oscillation before and after a vehicle 22 turn is executed. In other words, the computer 30 may detect the oscillation before and after a heading direction of the vehicle 22 changes. For example, the computer 30 may analyze data stored before the vehicle turn is executed and specifying rotational speeds and respective times to identify the oscillation of the rotational speeds specified by such data, and data stored after the vehicle turn was executed and specifying rotational speeds and respective times to identify the oscillation of the rotational speeds specified by such data.

The computer 30 may be programmed to detect the oscillation while a turn of the vehicle 22 is executed. In other words, the computer 30 may detect the oscillation while the heading direction of the vehicle 22 changes. For example, the computer 30 may analyze data stored while the turn of the vehicle 22 is executed and specifying rotational speeds and respective times to identify the oscillation of the rotational speeds specified by such data.

The computer 30 may be programmed to collect data specifying the rotational positions of each of the wheels 26. The computer 30 may detect the rotational positions of each of the wheels 26 based on data from the sensors 24 at each respective wheel 26. For example, one of the sensors 24 may provide data to the computer 30 specifying the rotational positions of the right front wheel 26, another of the sensors 24 may provide data to the computer 30 specifying the rotational positions of the left front wheel 26, etc. The computer 30 may store the data from the sensors 24 specifying the rotational positions along with an associated time at which the wheels 26 were at the detected rotational positions. Plotted data specifying the rotational positions of one of the wheels 26 is shown in FIG. 3 by plot P2, e.g., illustrating the rotational positions of the right front wheel 26 over time, and data specifying the rotational positions of another of the wheels 26 is shown by plot P3, e.g. illustrating the rotational positions of the left front wheel 26 over time. The plots P2, P3 are generally repeating, e.g., illustrating the rotational positions as the wheel 26 completes a full rotation, e.g., 0 to 359 degrees, and returns to an initial rotational position, e.g., 0 or 360 degrees. Although data specifying the rotational positions over time is only shown for two separate wheels 26 in FIG. 3, it is to be understood that the computer 30 may collect data for each wheel 26 of the vehicle 22.

The computer 30 may collect data specifying the rotational positions of each of the wheels 26 and the times at which such rotational positions were detected before and after actuating the steering system 34, before and after a vehicle turn is executed, while executing a turn of the vehicle 22, while the braking system 32 is actuated, etc. The computer 30 may determine the steering system 34 was actuated, the vehicle 22 turn the was executed, etc., based on data from the sensors 24 and/or commands transmitted by the computer 30, e.g., as described above. The rotational positions of the wheels 26 may change relative to each other when the vehicle 22 executes the turn, over the course of time with normal operation of the vehicle 22, etc. For example, compare the changing rotational positions of the wheels 26 relative to each other illustrated by the plots P2, P3 between T2 and T3 in FIG. 3, indicating that the vehicle 22 is executing a turn.

The computer 30 is programmed to detect the fault (i.e., indicating that one or more components, systems, etc., of the vehicle 22 and associated with one of the wheels 26 are in a condition that is not optimal for operation of the vehicle 22) based on a correlation between the oscillation in the rotational speeds of the driveline 28 and the rotational positions of one of the wheels 26. The correlation between the oscillation and rotational positions is identified based on time, i.e., the rotational positions directly vary with the oscillation with respect to time. For example, the computer 30 may correlate the oscillation with the rotational positions of one of the wheels 26 by identifying that one of the wheels 26 has a rotational position, e.g., 0 degrees, that consistently aligns with the local minimum values 46 or maximum values 48 of the rotational speed. In other words, the computer 30 may identify the wheel 26 having a consistent rotational positional at a same time as the local minimum value 46 or the local maximum values 48 of the rotational speed. For example, compare plot P2 indicating a consistent rotational positional at T1, T2, T3, and T4, all of which are at local minimum values 46 of plot P1 of the rotational speeds, with plot P3 indicating varying rotational positions at T1, T2, T3, and T4. In other words, FIG. 3 shows a correlation between the rotational positions of the wheel 26 illustrated by plot P2 and the oscillation in the rotational speeds of the driveline 28 illustrated in plot P1, and shows a lack of correlation between the rotational positions of the wheel 26 illustrated by plot P3 and the oscillation in the rotational speeds of the driveline 28 illustrated in plot P1.

The correlation between the wheel 26 position and the oscillation may occur as a result of a warped rotor of the braking system 32. For example, the warped rotor at one of the wheels 26 may generate increased friction between the rotor and a brake pad of the braking system 32 at certain rotational positions of the wheel 26. In other words, the warp of the rotor may cause the rotor to abut, or have increased pressure against, the brake pad at certain rotational positions and not at others. The increased friction, and subsequent decrease of friction, as the wheel 26 rotates through the rotational positions effects the rotational speeds of the driveline 28 and causes the oscillations. The increase in friction at certain rotational positions may be increased, and/or only occur, when the brake system 20 is actuated, e.g., when the brake pad is moved closer to the rotor.

The computer 30 may detect the fault associated with one of the wheels 26 based on the data, (e.g., specifying the rotational positions of the wheels 26 and the rotational speeds of the driveline 28) collected before and after executing the vehicle 22 turn, before and after actuating the steering system 34, while executing a turn of the vehicle 22, while the braking system 32 is actuated, etc. For example, the computer 30 may collect data specifying the rotational positions of the wheels 26 while the braking system 32 is actuated, then determine that the vehicle 22 has executed a turn, and again collect data specifying the rotational positions of the wheels 26 while the braking system 32 is actuated. The computer 30 may detect the fault associated with one of the wheels 26 based on the data collected while the braking system 32 is actuated before and after the turn was executed.

The computer 30 may be programmed to actuate a vehicle component in response to detecting the fault. Use of "in response to" and "upon determining" in the disclosure indicates a causal relationship, not merely a temporal relationship.

For example, the computer 30 may transmit a command to the braking system 32 specifying a reduced amount of hydraulic brake pressure provided by the braking system 32. The reduced amount of pressure may be less than a normal amount of pressure provided, e.g., 20% less for a certain amount of depression of the brake pedal. The reduced amount may be provided to the caliper of the brake system 20 at the wheel 26 associated with the fault and may be relative to an amount of pressure provided at other wheels 26 not associated with a fault. For example, the computer 30 may command 80% pressure provided at the wheel 26 associated with the fault and 100% pressure at the other wheels 26 not associated with the fault.

As another example, the computer may transmit a command to the user interface 42 specifying the fault and actuating the user interface to display the fault and the wheel associate with the fault to an occupant of the vehicle.

As another example, the computer 30 may store data specifying the fault associated with one of the wheels 26, e.g., in the memory of the computer 30. The data may specify the wheel 26 whose rotational positions correlate with the oscillation in the rotational speeds of the driveline 28. Additionally or alternately, the computer 30 may be programed to transmit the fault, e.g., to a computer remote from the vehicle 22 via cellular protocols, etc. The computer 30 may store or transmit the data specifying the fault in response to detecting the fault.

Figure 4:
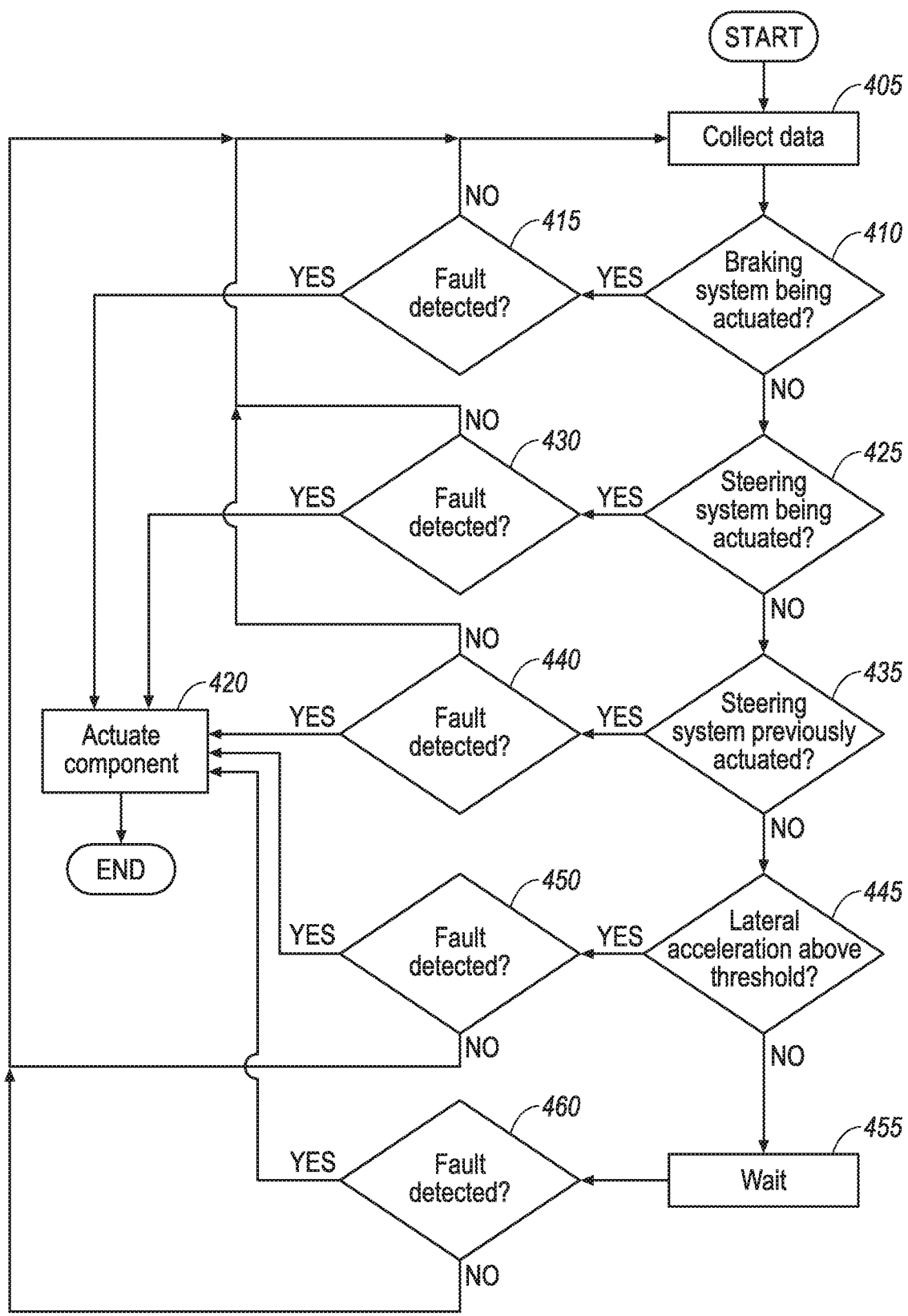
FIG. 4 is a flow chart illustrating a process for controlling the system for fault detection.

FIG. 4 is a process flow diagram illustrating an exemplary process 400 for fault detection. The process 400 begins in a block 405 in which the computer 30 receives data specifying the rotational speeds of the driveline 28, e.g., of the axle 38 and/or output shaft 40 of the transmission 36, and data specifying the rotational positions of each of two of more wheels 26 of the vehicle 22. The data is received from sensors 24, e.g., via the communication network 44. The computer 30 may receive the data substantially continuously or at time intervals, e.g., every 50 milliseconds. The computer 30 may store the data, e.g., on the memory, along with a time of the detection of the rotational speeds and rotational positions.

At a block 410 the computer 30 determines whether the braking system 32 is being actuated, e.g., based on data from the sensors 24, command(s) transmitted to the braking system 32 by the computer 30, etc. Upon determining the braking system 32 is being actuated the process 400 moves to a block 415. Upon determining that the braking system 32 is not being actuated the process 400 moves to a block 425.

At the block 415 the computer 30 determines whether a fault associated with one of the wheels 26 is detected based on a correlation between an oscillation in the rotational speeds of the driveline 28 and the rotational positions of the wheels 26. The computer 30 detects the oscillation by analysis of the data collected while the braking system 32 was actuated, the data specifying the rotational speeds of the driveline 28, the rotational positions of the wheels 26, and the related times of generation of such data (e.g., times of detection of the speeds and positions). The computer 30 detects the fault by identifying one of the wheels 26 as having consistent rotational positions at same times as local minimum values 46 or maximum values 48 in the oscillation of the rotational speed. Upon determining a fault associated with one of the wheels 26 is detected, the process 400 moves to a block 420. Upon determining a fault associated with one of the wheels 26 is not detected, the process 400 returns to the block 405.

At the block 420 the computer 30 actuates a component of the vehicle 22 in response to detecting the fault. For example, the computer 30 may store data specifying the fault. As another example, the computer 30 may transmit data specifying the fault. As another example, the computer 30 may command the braking system 32 to reduce an amount of hydraulic brake pressure provided to the brake at the wheel 26 associated with the fault. As yet another example, the computer 30 may command the user interface 42 to display the fault and the wheel 26 associated with the fault to an occupant. After the block 420 the process 400 may end. Alternately, the process 400 may return to the block 405.

At the block 425 the computer 30 determines whether the steering system 34 is being actuated or a vehicle turn is being executed, e.g., based on data from the sensors 24, command(s) transmitted to the steering system 34 by the computer 30, etc. Upon determining the steering system 34 is being actuated or a vehicle turn is being executed the process 400 moves to a block 430. Upon determining that neither the steering system 34 is not being actuated nor a vehicle turn is being executed the process 400 moves to a block 435.

At the block 430 the computer 30 determines whether a fault associated with one of the wheels 26 is detected based on a correlation between an oscillation in the rotational speeds of the driveline 28 and the rotational positions of the wheels 26. The computer 30 detects the oscillation by analysis of the data collected while the steering system 34 was being actuated or a vehicle turn was being executed, the data specifying the rotational speeds of the driveline 28, the rotational positions of the wheels 26, and the related times of generation of such data. The computer 30 detects the fault by identifying one of the wheels 26 as having consistent rotational positions at same times as local minimum values 46 or maximum values 48 in the oscillation of the rotational speed. Upon determining a fault associated with one of the wheels 26 is detected, the process 400 moves to the block 420. Upon determining a fault associated with one of the wheels 26 is not detected, the process 400 returns to the block 405.

At the block 435 the computer 30 determines whether the steering system 34 was actuated or a vehicle turn was executed, e.g., based on data from the sensors 24, command(s) transmitted to the steering system 34 by the computer 30, etc. Upon determining the steering system 34 was actuated or a vehicle turn was executed the process 400 moves to a block 430. Upon determining that neither the steering system 34 is being actuated nor a vehicle turn is being executed the process 400 moves to a block 435.

At the block 440 the computer 30 determines whether a fault associated with one of the wheels 26 is detected based on a correlation between an oscillation in the rotational speeds of the driveline 28 and the rotational positions of the wheels 26. The computer 30 detects the oscillation by analysis of the data collected before and after the steering system 34 was actuated or before and after a vehicle 22 turn was executed, the data specifying the rotational speeds of the driveline 28, the rotational positions of the wheels 26, and the related times of generation of such data. The computer 30 detects the fault by identifying one of the wheels 26 as having consistent rotational positions at same times as local minimum values 46 or maximum values 48 in the oscillation of the rotational speed. Upon determining a fault associated with one of the wheels 26 is detected, the process 400 moves to a block 420. Upon determining a fault associated with one of the wheels 26 is not detected, the process 400 returns to the block 405.

At the block 445 the computer 30 determines whether the vehicle 22 was subject to the lateral acceleration above a determined threshold, e.g., based on data from the sensors 24. Upon determining the vehicle 22 was subject to the lateral acceleration above the determined threshold the process 400 moves to a block 450. Upon determining the vehicle 22 was not subject to the lateral acceleration above the determined threshold the process 400 moves to a block 455.

At the block 450 the computer 30 determines whether a fault associated with one of the wheels 26 is detected based on a correlation between an oscillation in the rotational speeds of the driveline 28 and the rotational positions of the wheels 26. The computer 30 detects the oscillation by analysis of the data collected while the vehicle 22 was subject to the lateral acceleration above the determined threshold, the data specifying the rotational speeds of the driveline 28, the rotational positions of the wheels 26, and the related times of generation of such data. The computer 30 detects the fault by identifying one of the wheels 26 as having consistent rotational positions at same times as local minimum values 46 or maximum values 48 in the oscillation of the rotational speed. Upon determining a fault associated with one of the wheels 26 is detected, the process 400 moves to a block 420. Upon determining a fault associated with one of the wheels 26 is not detected, the process 400 returns to the block 405.

At the block 455 the computer 30 waits a specified amount of time, e.g., 10 minutes. The specified amount of time may be stored in the memory, e.g., during manufacturing of the vehicle 22. The specified amount of time may be determined by empirical testing such that normal operation of the vehicle 22 for the specified amount of time causes change in the rotational positions of the wheels 26 relative to each other, e.g., the wheels 26 rotate different amounts over the specified amount of time.

Next, at a block 460 the computer 30 determines whether a fault associated with one of the wheels 26 is detected based on a correlation between an oscillation in the rotational speeds of the driveline 28 and the rotational positions of the wheels 26. The computer 30 detects the oscillation by analysis of the data collected before and data collected after waiting the specified amount of time at the block 455, the data specifying the rotational speeds of the driveline 28, the rotational positions of the wheels 26, and the related times of generation of such data. The computer 30 detects the fault by identifying one of the wheels 26 as having consistent rotational positions at same times as local minimum values 46 or maximum values 48 in the oscillation of the rotational speed. Upon determining a fault associated with one of the wheels 26 is detected, the process 400 moves to a block 420. Upon determining a fault associated with one of the wheels 26 is not detected, the process 400 returns to the block 405.

With regard to the process 400 described herein, it should be understood that, although the steps of such process 400 have been described as occurring according to a certain ordered sequence, such process 400 could be practiced with the described steps performed in an order other than the order described herein. It further should be understood that certain steps could be performed simultaneously, that other steps could be added, or that certain steps described herein could be omitted. In other words, the description of the process 400 herein is provided for the purpose of illustrating certain embodiments and should in no way be construed so as to limit the disclosed subject matter.

Computing devices, such as the computer 30, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a first sensor configured to detect a rotational position of a first wheel;
a second sensor configured to detect a rotational position of a second wheel;
a third sensor configured to detect a rotational speed of a driveline operatively coupled to the first wheel and the second wheel; and
a computer in communication with the first sensor, the second sensor, and the third sensor, the computer programmed to detect a fault associated with the first wheel based on a correlation between an oscillation in the rotational speed of the driveline and the rotational position of the first wheel, and to detect a fault associated with the second wheel based on a correlation between the oscillation in the rotational speed of the driveline and the rotational position of the second wheel.

2. The system of claim 1, wherein the first wheel is spaced from the second wheel relative to a vehicle-longitudinal axis.

3. The system of claim 1, wherein the first wheel is spaced from the second wheel relative to a vehicle-lateral axis.

4. The system of claim 1, wherein the third sensor is configured to detect a rotational speed of a transmission output shaft.

5. The system of claim 1, wherein the third sensor is configured to detect a rotational speed of an axle.

6. The system of claim 1, further comprising a braking system, and wherein the computer is programmed to detect the oscillation while the braking system is actuated.

7. The system of claim 1, further comprising a steering system, and wherein the computer is programmed to detect the oscillation and the rotational positions of the first wheel and the second wheel before and after actuating the steering system.

8. The system of claim 1, wherein the computer is programmed to detect the oscillation and the rotational positions of the first wheel and the second wheel before and after a vehicle turn is executed.

9. The system of claim 1, wherein the computer is programmed to at least one of store data specifying the fault or transmit data specifying the fault in response to detecting the fault.

10. The system of claim 1, wherein the computer is programmed to correlate the oscillation with the rotational positions of the first wheel or the rotational positions of the second wheel by identifying a plurality of local minimum or maximum values in the rotational speeds of the driveline and identifying the first wheel or the second wheel as having rotational positions that consistently align with the local minimum or maximum values.

11. A system, comprising:
a processor; and
a memory storing instructions executable by the processor to:
detect rotational positions of a first wheel of a vehicle and a second wheel of the vehicle based on data from a first sensor and a second sensor;
detect an oscillation in rotational speeds of a driveline operatively coupled to the first wheel and the second wheel based on data from a third sensor;
detect a fault associated with the first wheel based on a correlation between the oscillation in the rotational speeds of the driveline and the rotational positions of the first wheel;
detect a fault associated with the second wheel based on a correlation between the oscillation in the rotational speeds of the driveline and the rotational positions of the second wheel; and
actuate a vehicle component in response to detecting the fault associated with the first wheel or the second wheel.

12. The system of claim 11, wherein the instructions include instructions to at least one of store or transmit data specifying the fault.

13. The system of claim 11, wherein the instructions include instructions to reduce an amount of hydraulic brake pressure provided by a braking system in response to detecting the fault.

14. The system of claim 11, wherein the instructions include instructions to correlate the oscillation with the rotational positions of the first wheel or the rotational positions of the second wheel by identifying a plurality of local minimum or maximum values in the rotational speeds of the driveline and identifying the first wheel or the second wheel as having rotational positions that consistently align with the local minimum or maximum values.

15. The system of claim 11, wherein the instructions include instructions to collect data specifying the detected positions of the first wheel and the second wheel before and after executing a vehicle turn, and detect the fault associated with the first wheel or the second wheel with the data collected before and after executing the vehicle turn.

16. The system of claim 11, wherein the instructions include instructions to collect first data specifying the detected positions of the first wheel and the second wheel, wait a specified amount of time, then collect second data specifying the detected positions of the first wheel and the second wheel, and detect the fault associated with the first wheel or the second wheel with the first data and the second data.

17. The system of claim 11, wherein the instructions include instructions to collect data specifying the detected positions of the first wheel and the second wheel while actuating a brake system of the vehicle, and detect the fault associated with the first wheel or the second wheel with the data collected while actuating the brake system.

18. The system of claim 11, wherein the instructions include instructions to collect data specifying the detected positions of the first wheel and the second wheel while a turn of the vehicle is executed, and detect the fault associated with the first wheel or the second wheel with the data collected while executing the turn.

19. The system of claim 11, wherein the instructions include instructions to collect data specifying the detected positions of the first wheel and the second wheel while the vehicle is subject to lateral acceleration above a determined threshold, and detect the fault associated with the first wheel or the second wheel with the data collected while the vehicle was subject to the lateral acceleration above the determined threshold.

20. The system of claim 11, further comprising the vehicle supporting the processor and the memory.

* * * * *